United States Patent [19]

Sisson et al.

[11] Patent Number: 5,759,228
[45] Date of Patent: Jun. 2, 1998

[54] NOZZLE FOR ELECTRIC DISPERSION REACTOR

[75] Inventors: Warren G. Sisson, Oak Ridge; Michael T. Harris; Timothy C. Scott, both of Knoxville; Osman A. Basaran, Oak Ridge, all of Tenn.

[73] Assignee: Martin Marietta Energy Systems, Inc., Oak Ridge, Tenn.

[21] Appl. No.: 585,978

[22] Filed: Jan. 16, 1996

Related U.S. Application Data

[60] Division of Ser. No. 291,911, Aug. 18, 1994, Pat. No. 5,503,372, and a continuation-in-part of Ser. No. 35,772, Mar. 23, 1993, Pat. No. 5,464,195, which is a continuation-in-part of Ser. No. 832,091, Feb. 6, 1992, Pat. No. 5,207,973, which is a division of Ser. No. 441,793, Nov. 27, 1989, Pat. No. 5,122,360.

[51] Int. Cl.$^6$ ............................................. B22D 11/01
[52] U.S. Cl. ............................ 75/255; 266/170; 425/6
[58] Field of Search ............................ 425/6, 178.8, 174; 264/10; 75/255; 266/170

[56] References Cited

U.S. PATENT DOCUMENTS

| | | | |
|---|---|---|---|
| 4,788,016 | 11/1988 | Colclough et al. | 425/6 |
| 4,795,330 | 1/1989 | Noakes et al. | 425/6 |
| 4,960,351 | 10/1990 | Kendall, Jr. et al. | 425/6 |
| 5,164,198 | 11/1992 | Bauckhage et al. | 425/6 |
| 5,207,973 | 5/1993 | Harris et al. | 266/170 |
| 5,464,195 | 11/1995 | Sisson et al. | 266/170 |
| 5,503,372 | 4/1996 | Sisson et al. | 266/170 |

*Primary Examiner*—Scott Kastler
*Attorney, Agent, or Firm*—Edward A. Pennington; Shelley L. Stafford

[57] ABSTRACT

A nozzle for an electric dispersion reactor includes two coaxial cylindrical bodies, the inner one of the two delivering disperse phase fluid into a continuous phase fluid. A potential difference generated by a voltage source creates a dispersing electric field at the end of the inner electrode.

7 Claims, 3 Drawing Sheets

NOZZLE FOR ELECTRIC DISPERSION REACTOR

RELATED APPLICATIONS AND PATENTS

This is a divisional of application Ser. No. 08/291,911 filed Aug. 18, 1994, now U.S. Pat. No. 5,503,372, and a Continuation-In-Part of U.S. patent application 035,772, filed Mar. 23, 1993, now U.S. Pat. No. 5,464,195 which is a Continuation-In-Part of U.S. patent application Ser. No. 832,091, filed Feb. 6, 1992, now U.S. Pat. No. 5,207,973, which is a Divisional of U.S. patent application Ser. No. 441,793, filed Nov. 27, 1989, which is now U.S. Pat. No. 5,122,360, issued Jun. 16, 1992, the subject matter of which is incorporated herein by reference.

This invention was made with Government support under contract no. DE-AC05-84OR21400 awarded by the U.S. Department of Energy to Martin Marietta Energy Systems, Inc., and the Government has certain rights in this invention.

FIELD OF THE INVENTION

The present invention relates generally to the production of metal oxide powders and, more specifically, to an improved nozzle used in an electric dispersion reactor in the production of metal oxide powders, for example.

The improved nozzle has two coaxially disposed hollow nonconducting cylindrical bodies, the inner cylindrical body being used to introduce a disperse phase fluid into a continuous phase fluid. The outer cylindrical body includes a nonconductive hydrophobic sheath on its inner wall preventing droplets in the aqueous-phase dispersion from collecting on the wall.

BACKGROUND OF THE INVENTION

The development of new ceramic materials is sometimes hindered by the ability to reproducibly synthesize high quality starting powders. The ability to control the solid morphology of materials formed from powders is largely dependent upon controlling particle size and size distribution. Control is also dependent upon minimizing particle-particle interaction. Small particles with a narrow range of particle size distribution are generally desired. Alternatively, a good distribution of particle sizes may include relatively large particles which form the bulk of the material as well as smaller particles used for filling the interstitial spaces between the larger particles during manufacture.

A number of methods have been developed to form monodispersed powders (i.e., particles with a narrow range of particle size distribution and low tendency toward agglomeration) by chemical methods such as the controlled homogeneous precipitation of metal oxides from metal alkoxide by hydrolysis in organic liquid systems. These methods prove to be quite good at producing high purity metal oxide powders. In many cases, however, the conditions which are favorable for metal alkoxide hydrolysis, and the subsequent metal oxide precipitation, are not amenable to minimizing particle—particle interactions. Consequently, the powders form agglomerates and become polydispersed. Other attempts to produce monodispersed metal oxide powders using the technique of metal alkoxide hydrolysis have involved the use of mechanical stirrers to disperse the aqueous phase in the organic liquid system. These techniques are energy intensive and generally do not produce metal oxide powders with the desired size distribution.

SUMMARY OF THE INVENTION

Therefore, it is an object of the present invention to provide a method for preparing metal oxide powder within a desired range of size distribution and with a minimum of particle—particle interactions.

It is a further object of the present invention to provide a method and apparatus for preparing monodispersed metal oxide powders which possess optimum morphology and surface properties for use as ceramic precursors. The apparatus utilized in accomplishing the instant invention includes a reaction nozzle that facilitates the preparation of metal oxide powder.

Another object of the present invention is to provide a reaction nozzle permitting high capacity dispersion operations at high dispersion concentrations.

In general, this invention relates to processes for forming monodispersed powders by forcing particle growth in localized reaction zones. These reaction zones are created by the dispersion of micro-droplets of a disperse phase fluid within a continuous phase fluid. Small particles (0.1–5 micrometers) are produced because the diffusion and reaction of the dispersed micro-droplet occurs very rapidly. Formation and dispersion of submicron-sized micro-droplets within a relatively nonconducting continuous phase is accomplished through the use of high-intensity-pulsed electric fields, i.e., pulsed fields with strengths greater than 1 kilovolt per centimeter. These electric fields are produced within the outer cylindrical body of the reaction nozzle where the disperse phase and continuous phase fluid react.

Throughout the body of this disclosure the term "disperse phase fluid" indicates a solution, or material, which is atomized into micro-droplets when the appropriate electric field is applied. The term "continuous phase fluid" refers to the fluid into which the disperse phase fluid is dispersed. In a preferred embodiment the continuous phase fluid is dielectric and thus is unaffected by the electrical field, and reacts with the atomized disperse phase fluid, which is preferably electrolytic, to form metal hydroxide or metal oxalate particles.

The present invention provides a method for preparing metal oxide powders. Briefly, the method comprises preparing a first solution which is a non-conductive continuous phase fluid. This first solution is preferably a substantially organic solution. A second solution, comprising a conductive disperse phase fluid that is substantially immiscible in the first solution, is prepared and delivered to the second solution. This second solution is preferably an aqueous solution. The second solution is then introduced within the first solution. The second solution is atomized by a pulsed electrical field forming micro-drops of the second solution. Reagents in the first solution diffuse into and react with the micro-drops of the second solution to form metal hydroxide or metal oxalate particles. The particles are then recovered and dried to produce the metal oxide powder. It should be noted that the continuous phase fluid could be conductive and the disperse phase fluid could be non-conductive, although the preferred embodiment utilizes the alternate arrangement.

In one embodiment of the present invention the first solution comprises a metal alkoxide and the second solution comprises an aqueous solution. The aqueous solution is chosen from the group consisting of neutral, acidic and basic aqueous solutions. In another embodiment of the invention, the first solution is a liquid metal alkoxide. Other embodiments of the invention include those where the metal alkoxide comprises a metal chosen from the group consisting of main group metals, transition metals, alkali and alkaline earth metals and lanthanides and actinides. The alkoxide is chosen from the group consisting of derivatives of straight chain and branched chain alcohols.

Another embodiment of the present invention provides that the first solution comprises an alcohol and the second solution comprises an aqueous solution with a water soluble metal salt. In one embodiment of the invention the first solution comprises an alcohol and ammonia. In additional embodiments of the invention the water soluble metal salt comprises a metal chosen from the group consisting of main group metals, transition metals, alkali and alkaline earth metals and lanthanides and actinides. In addition, precipitation agents are chosen from the group consisting of ammonium hydroxide and oxalic acid. The alcohol in another embodiment of the invention comprises straight chain and branched chain alcohols having more than two carbons in the chain.

In a first embodiment of the invention a pulsed electrical field is generated by producing a direct current (D.C.) voltage offset with superimposed voltage spikes. The voltage level of the spikes is between about two kilovolts per centimeter and about 100 kilovolts per centimeter with the constant D.C. offset being about 50% of this value. The voltage spikes of the electric field are produced at a frequency of between about 100 Hz and about 3,000 Hz. The first embodiment utilizes a reaction vessel in combination with a pair of electrodes to achieve the desired results. In use, a drop of a conductive disperse aqueous phase is introduced into the reaction vessel that is filled with the non-conductive continuous organic phase. At this point, the solutions reaction in the manner previously described.

A second embodiment is also provided for preparing metal oxide powders. The apparatus comprises a reaction nozzle for containing a flow of a first solution that is preferably a non-conductive organic solution and a second solution preferably comprising a conductive aqueous solution that is substantially immiscible in the first solution. A hollow inner cylindrical body is provided for delivering the second solution into the first solution. Also, a hollow outer cylindrical body is provided for containing a flow of the first solution. A voltage source interacts with an electrode located outside of the outer cylindrical body to apply a pulsed electrical field to the second solution. The pulsed electrical field fractures the second solution to form micro-drops. The first solution then reacts with the micro-drops of the second solution to form metal hydroxide or metal oxalate particles. The particles are finally heat treated to produce a metal oxide powder.

The preferred reaction nozzle includes a hollow inner cylindrical body. The inner cylindrical body is nonconductive and preferably constructed from glass. The inner cylindrical body is coaxially disposed within a hollow outer cylindrical body, which is also nonconductive and constructed from glass. The outer cylindrical body includes a nonconductive hydrophobic sheath along its inner wall. The coaxial bodies create an annular space through which the organic solution flows in a high flow velocity fashion. In use, the outer cylindrical body and the inner cylindrical body are dielectric and remain uncharged. An electrical field is generated by a charged electrode positioned outside of the outer cylindrical body. This electrode creates the electrical field necessary to generate the dispersion discussed above.

The use of nonconducting inner and outer cylindrical bodies, in combination with the hydrophobic sheath, minimizes the build-up of the conducting dispersed phase material in the electrode region. Additionally, the positioning of the electrode prevents the occurrence of short circuits. The coaxial arrangement of the inner cylindrical body and the outer cylindrical body eliminates arcing and solid build up that occurs in reactors having exposed nozzles and electrodes in low velocity regions. Additionally, the configuration creates a very high electric field strength in the electrode region which enhances dispersion of the disperse phase solution.

When using the instant reaction nozzle, the velocity of the continuous organic phase is very high. This enhances the removal of disperse phase fluid from the electrode region. Further, the disperse aqueous phase, that is subjected to the electrical fields, has an internal pressure higher than the pressure of the continuous organic phase. Thus, the dispersion is more easily swept pass the outer cylindrical body region, in addition to the enhanced dispersion and the effects of the flow of the continuous organic phase. This minimizes the build-up of dispersed conducting materials in the reaction nozzle region and allows the formation of a more concentrated dispersion in areas of the reactor outside the reaction nozzle.

As a result, the instant reaction nozzle encourages the formation of ceramic precursor particles by providing a continuous phase flow velocity that is similar to, or greater than, the disperse phase flow velocity. Particle formation is also encouraged by the electric field induced stresses that propel the dispersion away from the inner cylindrical body and out of the reaction nozzle region.

During a typical operation, a flow of the disperse aqueous phase solution is introduced into a continuous phase of a substantially organic solution. The disperse aqueous phase is introduced through the inner cylindrical body which is uncharged. An electric field is applied to the first solution by the energized electrode position outside the outer wall of the outer cylindrical body. A voltage is applied to the electrode such that the generated electric field is a pulsed D.C. electric field having a voltage between about 15 kilovolts and about 30 kilovolts.

When the continuous phase contains a liquid metal alkoxide and the aqueous phase contains water which is either neutral, acidic or basic, then it is believed that the following reactions take place in the micro-droplets. It is believed that initially there is a hydrolysis reaction as is shown in reaction (1). The metal is designated by "M" and has a valence n.

  (1)

The metal alkoxide is converted in the presence of water into a metal hydroxide with the alkoxide coming off as alcohol, ROH. The metal hydroxide particles then precipitate out of the solution. The metal hydroxide, M (OH)$_n$, is then collected and dehydrated in a dryer according to reaction (2) forming the metal oxide.

  (2)

The metal oxide powders produced by this method are highly porous shells and flakes. The powder is a fine, homogeneous, free-flowing metal oxide. The powder may be used for packaging material (i.e., for electronic components) or, because of their high surface area, as chromatographic and catalytic support materials.

Rather than having the metal as a metal alkoxide in the continuous phase, the metal may be a part of a water soluble metal salt which is dissolved in the aqueous phase solution. In this case, the continuous phase comprises an alcohol or an alcohol with oxalic acid. In operation, the formation of the micro-drops is similar to that described above. The reactions forming the metal hydroxide or metal oxalate particles and metal oxide powders, reactions (3)–(5) are believed to be similar to reactions (1) and (2) above.

The formation of a metal oxide powder from an alcoholic continuous phase is believed to follow the steps shown in reactions (3) and (4).

$$M^{n+} + nOH^- \rightarrow M(OH)_n (ppt.) \quad (3)$$

$$M(OH)_n \rightarrow MO_{n/2} + (n/2)(H_2O) \quad (4)$$

The formation of a metal oxide powder from an alcoholic continuous phase containing oxalic acid is shown in reactions (5) and (6).

$$mM^{n+} + (mn/2)H_2C_2O_4 \rightarrow M_m(-C_2O_4)_{(mn/2)}(ppt.) + mnH^{30} \quad (5)$$

$$M_m(C_2O_4)_{mn/2} + (mn/2)O_2 \rightarrow mMO_{n/2} + mnCO_2 \quad (6)$$

The metal oxide powders formed using the water soluble metal salts comprise dense, spherical particles. These dense particles are also suitable for forming high density ceramic articles.

DETAILED DESCRIPTION OF THE PREFERRED EMBODIMENT

Figure 1:
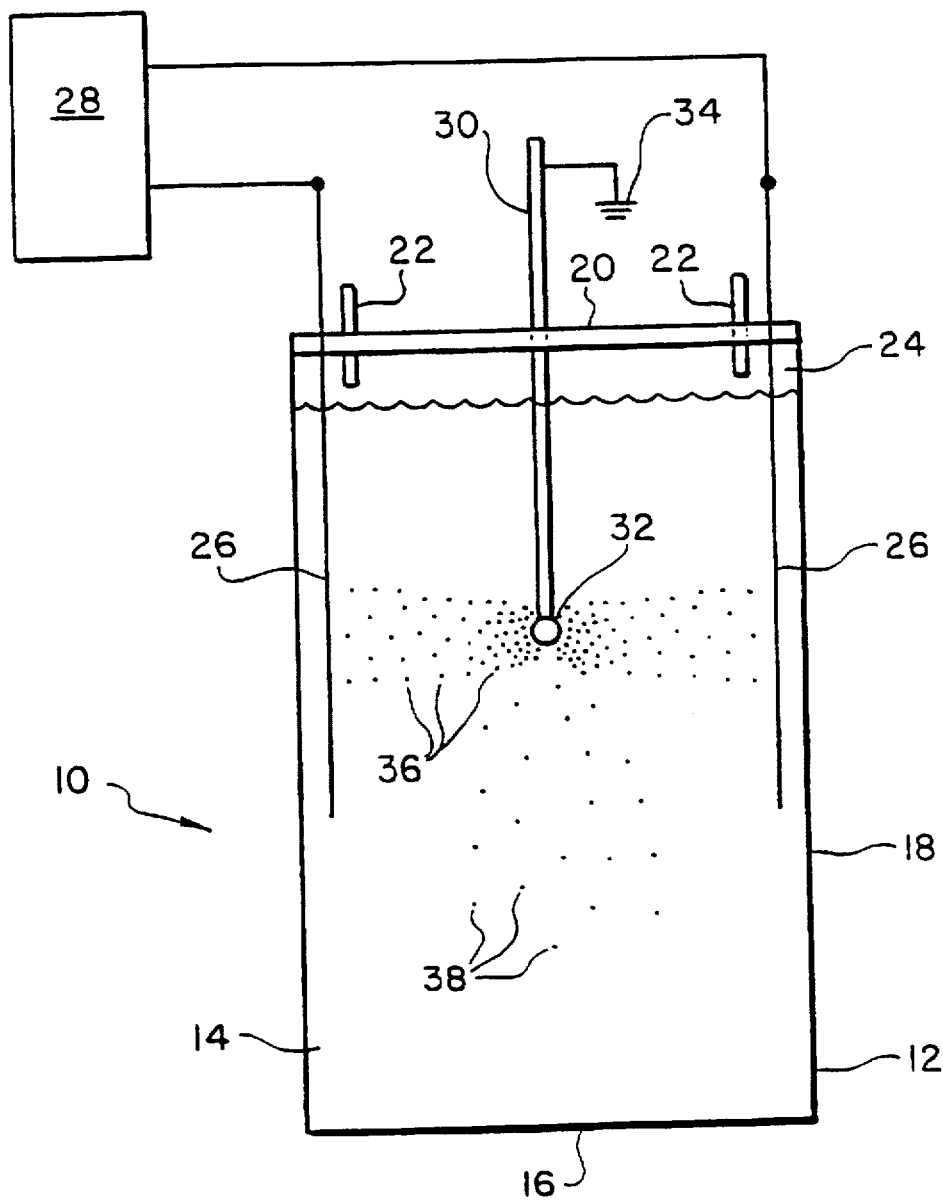
FIG. 1 is a schematic diagram of a first embodiment of an apparatus for producing powders according to the present invention, based on batch processing.

Referring now to the drawings in which like reference characters designate like or corresponding parts throughout the several views, there is shown in FIG. 1 an embodiment of an apparatus 10 for producing metal oxide powder in accordance with the present invention. The depicted apparatus 10 generally comprises a reaction vessel 12 for containing a continuous phase fluid 14, which is preferably organic and dielectric (or electrically non-conductive). The reaction vessel 12 may be of any number of shapes but in one embodiment the reaction vessel 12 is an open cylinder with a closed bottom 16 joined to the cylindrical side wall 18. The continuous organic phase fluid 14 is loaded into the reaction vessel 12. A reaction vessel cover 20 is placed onto the top of the reaction vessel 12 providing a gas tight seal at the side wall 18. The reaction vessel cover 20 is fitted with ports 22 for purging the head space 24 of the reaction vessel.

The reaction vessel 12 is also fitted with electrodes 26 which are placed in intimate contact with the continuous organic phase 14 and then continue through the head space 24 and the reaction vessel cover 20 to a pulsed electric field source 28. The pulsed electric field source 28 provides a pulsed electric signal which creates an offset D.C. voltage with superimposed spikes.

There is also provided a nozzle 30 for the delivery of drops of aqueous solution 32. The nozzle 30 is constructed of conductive material such as metal and is connected to an electrical ground 34. The presence of a pulsed field on the electrodes 26 and ground 34 at the nozzle 30 generates a pulsed electric field between the electrodes 26 and the nozzle 30. Upon exit from the nozzle 30, the drop of aqueous solution 32 is fractured into aqueous micro-drops 36. The micro-drops 36 react with the continuous organic phase fluid 14 and form solid metal hydroxide particles 38 which drop to the bottom of the reaction vessel 12. Upon the completion of the addition of the drops of aqueous solution 32 to the continuous organic phase fluid 14 in the presence of the pulsed electric field the resulting metal hydroxide particles 38 are recovered, filtered or centrifuged and dried to produce the metal oxide powder.

The metal is contained in the continuous organic phase fluid 14 or in the drops of aqueous solution 32 as desired. The metal is present as a metal alkoxide when it is present in the continuous organic phase fluid 14 and it is present as a water soluble metal salt when it is in the drops of aqueous solution 32.

In operation, the apparatus 10 is prepared by filling the reaction vessels 12 with the continuous organic phase fluid 14. In the following description it will be assumed that the continuous organic phase fluid comprises a metal alkoxide and that the drops of aqueous solution comprise an aqueous solution that is either neutral, basic or acidic. A similar operation is used where the continuous organic phase fluid 14 comprises an alcohol and the drops of aqueous solution 32 comprise a water soluble metal salt in water.

The reaction vessel cover 20 is placed on the reaction vessel 12 and the head space 24 is purged with the ports 22. The purging usually involves the replacement of air in the head space 24 with a nonflammable gas such as nitrogen. A pulsed electric field is developed between the electrodes 26 and the nozzle 30. This electric field contains two components: a D.C. voltage offset of between about 2 kilovolts per centimeter and about 100 kilovolts per centimeter. The spikes are pulsed at a frequency between about 100 Hz and about 3,000 Hz.

Drops of the aqueous solution 32 are introduced into the continuous organic phase fluid 14 and are immediately atomized by the pulsed electric field creating aqueous micro-drops 36. These micro-drops 36 have sizes in the micrometer range and are dispersed throughout the continuous organic phase fluid 14. The continued application of the pulsed electric field maintains the micro-drops in a dispersed state through the continuous organic phase fluid 14. The metal alkoxide of the continuous organic phase fluid 14 reacts with the aqueous solution of the micro-drops 36 forming metal hydroxide particles 38 which precipitate out of the continuous organic phase fluid 14. The reaction of the metal alkoxide with the aqueous micro-drops 36 is sufficiently rapid that an entire micro-drop 36 is converted to a metal hydroxide particle 38. The metal hydroxide particle 38 that is formed is smaller than the aqueous micro-drops 36 from which it formed.

Aqueous micro-drops 36 are added to the continuous organic phase fluid 14 for a period of about 10 minutes. At the end of that time, the pulsed electric field is removed and the metal hydroxide particles 38 are allowed to settle to the bottom 16 of the reaction vessel 12. The reaction vessel cover 20 is removed and the continuous organic phase fluid 14 containing the metal hydroxide particles 38 is filtered to recover the metal hydroxide particles 38. The particles 38 are washed and heat treated for the metal oxide.

The dried product is a fine, homogeneous, free-flowing metal oxide powder. The powder particles have sizes that range from about 0.1 micrometers to about 2 micrometers and are porous and flaky when dried.

A similar procedure is followed when the continuous organic phase fluid 14 comprises an alcohol and the drops of aqueous solution 32 comprise a water soluble metal salt dissolved in an aqueous solution. The metal oxide powders which result from that combination of solutions are generally dense and spherical.

Figure 2:
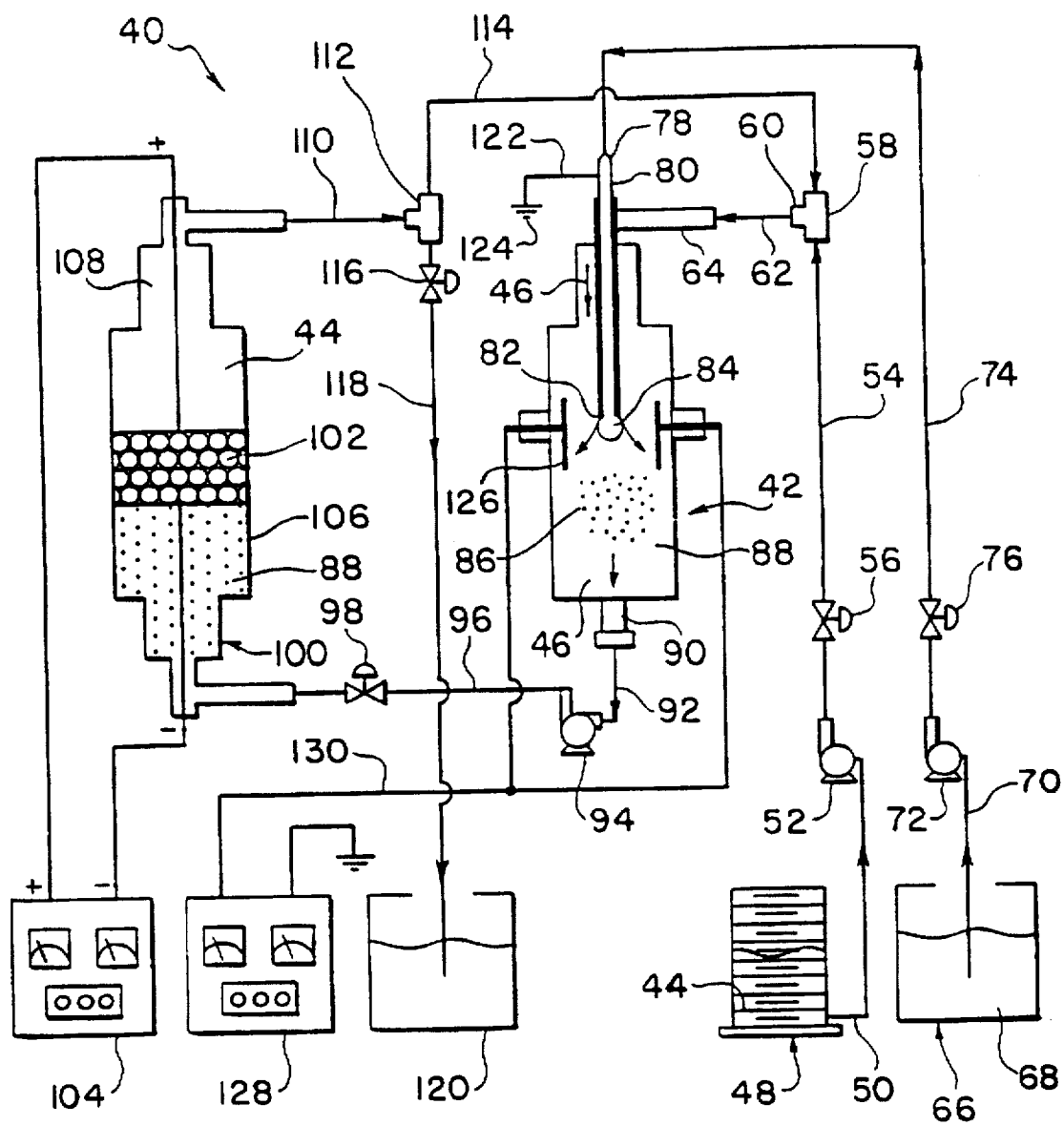
FIG. 2 is a schematic diagram of a second embodiment of an apparatus for producing powders according to the present invention, employing a continuous flow reaction nozzle.

Another embodiment of the present invention is shown in FIG. 2. This embodiment includes an apparatus 40 for the continuous production of metal oxide powder. The apparatus comprises a reaction vessel 42 which contains a continuous organic phase fluid 44. The organic phase fluid 44 is moved through the reaction vessel 42 in the direction of arrows 46. The organic phase fluid 44 is supplied from an organic phase storage 48 which is external to the reaction vessel 42. The organic phase fluid 44 is supplied to the reaction vessel 42 from the storage 48 along conduit 50 to an organic phase fluid supply pump 52, such as a Masterflex pump. The supply pump 52 is connected to the reaction vessel 42 by conduit 54 which contains a supply shut-off valve 56. The opposite end of conduit 54 is connected to a T-connector 58 which output 60 is connected to reaction vessel organic phase fluid connection 64.

An aqueous phase fluid storage 66 contains the aqueous phase fluid 68 which is supplied to the reaction vessel 42. A conduit 70 connects the aqueous phase fluid storage 66 with an aqueous phase fluid supply pump 72. The output of the aqueous phase fluid supply pump 72 is connected to a conduit 74 which contains an aqueous phase supply shut-off valve 76. The opposite end of conduit 74 is attached to one end 78 of an aqueous phase nozzle 80. The aqueous phase fluid 68 travels down the aqueous phase nozzle 80 to the other end 82 which is submerged in the continuous organic phase fluid. 44 of the reaction vessel 42. A drop 84 of the aqueous phase 68 is released from the end 82 of the aqueous phase nozzle 80 into the continuous organic phase 44. In a process to be described in more detail hereinafter, the drop 84 is atomized into micro-drops 86 which react with the continuous organic phase 14 to form metal hydroxide particles 88.

The metal hydroxide or metal oxalate particles 88 and continuous organic phase fluid 44 are removed from the reaction vessel 42 at the exit port 90. The exit port 90 is connected to the conduit 92, the distal end of which is connected to a product pump 94. The continuous organic phase fluid 44 containing the metal oxide particles 88 is pumped along a conduit 96, through a valve 98, to an electrical bed filtration unit 100. In the electrical bed filtration unit 100 a filter element 102, such as glass beads, is electrically connected to a filter power supply 104, such as a Hyptronics Model 825C High Voltage D.C. Power Supply. The filter power supply 104 applies a voltage across the filter unit 102 thereby trapping the metal hydroxide or metal oxalate particles 88 on the particulate side 106 of the electrical bed filter unit 100. This allows the continuous organic phase fluid 44 to pass through the filter unit 102 to the filtrate side 108 of the filtration unit 100. The filtrate is then returned to the reaction vessel 42 along the conduit 110 to the T-connector 112. One output side of the T-connector 112 is connected to conduit 114, which is also joined to T-connector 58, thereby returning the continuous organic phase fluid 44 to the reaction vessel 42. Alternatively, a valve 116 provided in conduit 118 may be opened to allow passage of the continuous organic phase fluid 44 to a filtrate storage 120.

The aqueous phase nozzle 80 of the reaction vessel 42 is connected by a connector 122 to an electrical ground 124. There are electrodes 126 which are submerged in the continuous organic phase fluid 44 of the reaction vessel 42 in the vicinity of the end 82 of the aqueous phase nozzle 80. The electrodes 126 are connected to an electrical field power supply 128, such as a Velonix Model 660 High Voltage Pulse Generator, through the wire 130. The electrical field power supply 128 supplies an electrical signal to the electrodes 126 which is comprised of an offset D.C. voltage which has voltage spikes riding atop the D.C. offset. The voltage applied to the electrodes 126 from the electrode power supply 128 may be positive or negative without affecting the efficiency of the system. The presence of the pulsed electric field generated between the electrodes 126 and the grounded aqueous phase nozzle 80 operates to atomize the drop 84 into micro-droplets 86. Those micro-droplets 86 then react with the continuous organic phase fluid 44 producing the metal hydroxide or metal oxalate particles 88.

In operation, the reaction vessel 42 is loaded with a continuous organic phase fluid 44 from the organic phase storage unit 48. When the reaction vessel 42 is at its capacity, the continuous organic phase fluid 44 is recirculated through the electrical bed filtration unit via the conduit 92, the product pump 94, the conduit 96, the valve 98, the electrical bed filtration unit 100, the conduit 110, the T-connection 112, the conduit 114, the T-connection 58 and the conduit 62. This recirculation is continued until the continuous organic phase 44 is exhausted. At that time, the valve 116 in the conduit 118 is opened and the exhausted continuous organic phase fluid 44 is placed into the filtrate storage unit 120.

The aqueous phase fluid 68 is loaded into the reaction vessel 42 from the aqueous phase storage 66. The aqueous phase fluid 68 is applied dropwise to the continuous aqueous phase fluid 44. As each drop 84 emerges from the end 82 of the aqueous phase nozzle 80 it is atomized into micro-drops 86 by the pulsed electrical field generated between the electrodes 126 and the ground 124 attached to the aqueous phase nozzle 80. The reagents in the continuous organic phase fluid 44 react with aqueous solution 68 in the micro-drops 86 to form the metal hydroxide or metal oxalate particles 88. The continuous organic phase 44 and the metal hydroxide particles 88 are then swept toward the exit port 90 of the reaction vessel 44 and into the recirculation loop. In the electrical bed filtration unit 100, the metal hydroxide particles 88 are trapped by the filter element 102 on the particulate side 106 of the filtration unit 100. The continuous organic phase fluid 44 is then returned to the reaction vessel 42 as previously described.

The metal hydroxide or metal oxalate particles 88 may be removed from the electrical bed filtration unit 100 and recovered by washing and drying to produce a metal oxide powder. The powders produced using this apparatus are fine, homogeneous and free-flowing.

In order to provide a better understanding of the present invention the following examples are given by way of illustration and not by way of limitation.

EXAMPLE I

A reaction vessel was filled with a continuous organic phase comprising a metal alkoxide of a type listed in Table I. A pulsed electric field with a field strength of 5 kV/cm offset D.C. with 10 kV/cm spikes was applied to the continuous phase. An aqueous disperse phase of the type listed in Table I was injected into the continuous phase from a grounded 0.125 cm syringe tip in the vicinity of the pulsed electric field. The drops emerging from the syringe tip were readily atomized into micro-drops which were dispersed in the continuous phase. The continuous phase reacted immediately with the micro-drops to form the metal hydroxide particles. The metal hydroxide was formed in yields of greater than 99.5%. Upon completion of the addition of the aqueous phase, the reaction solution was filtered and the metal hydroxide was recovered. The metal hydroxide was dried at 100° C. for 24 hours. Table I lists a description of the final hydrous metal oxide powder. In all cases, the powders were fine, homogeneous, monodisperse, free-flowing powders.

TABLE I

| Sample | Continuous Phase | Disperse Phase | Product |
|---|---|---|---|
| A | TEOS[1] | 0.7M NH$_3$ in water | Porous silica shells |
| B | 2-EH[2] with TIE[3]/ASB[4] (1/3) | water | Well mixed submicron powder containing hydrous alumina and titania in a molar ratio of 3:1 |
| C | 2-EH with TIE/ABS[5] | water | Well mixed submicron powder containing hydrous alumina and titania in a molar ratio of 3:1 |
| D | 2-EH with ASB/ZB[6] | water | Well mixed submicron powder containing hydrous alumina and zirconia in a molar ratio of 2.6:1 |
| E | 2-EH with ABS/ZB (2.6/1) | water | Well mixed submicron powder containing hydrous alumina and zirconia in a molar ratio of 2.6:1 |

[1]Tetraethylorthosilicate
[2]2-ethyl 1-hexanol
[3]titanium ethoxide
[4]aluminum sec-butoxide
[5]aluminum butoxide stearate
[6]zirconium butoxide

EXAMPLE II

A reaction vessel was filled with a continuous organic phase comprising an alcohol mixture of the type listed in Table II. A pulsed electric field with a field strength of 5 kV/cm offset D.C. and 5 kV/cm spikes was applied to the continuous phase. An aqueous disperse phase with a metal salt mixture of the type listed in Table II was injected into the continuous phase from a grounded 0.125 cm syringe tip in the vicinity of the pulsed electric field. The drops emerging from the syringe tip were readily fractured into micro-drops which were dispersed in the continuous phase. The continuous phase reacted immediately with the micro-drops to form the metal hydroxide or metal oxalate particles. The metal hydroxide or metal oxalate was formed in yields of greater than 99.5%. Upon completion of the addition of the aqueous phase, the reaction solution was filtered and the metal hydroxide was recovered. The metal hydroxide was dried at about 150° C. for 24 hours. Table II lists a description of the final metal oxide powder. In all cases, the powders were fine, homogeneous, mono-disperse, free-flowing powders.

TABLE II

| Sample | Continuous Phase | Disperse Phase | Product |
|---|---|---|---|
| F | 2-EH/EtOH[7] (95:5 vol %) with 0.2M NH$_3$ | aqueous metal nitrate solution Y/Ba/Cu (1:2:3) | 0.1 to 2 micron spherical particles containing mixed oxides of Y, Ba and Cu with a molar ratio of about (1:2:3) |
| G | 2-EH/EtOH (95.5 vol %) with 0.2M NH$_3$ | aqueous metal nitrate solution of Cu | 0.1 to 2 micron spherical particles containing oxides of Cu |
| H | 2-EH/EtOH (95.5 vol %) with 0.2M NH$_3$ | aqueous metal nitrate solution of Cu | 0.1 to 2 micron spherical particles containing oxides of Cu |
| I | 2-EH/CYHEX[8]/EtOH with 0.2M NH$_3$ | aqueous metal nitrate solution Y/Ba/Cu (1:2:3) | Submicron sized spherical particles containing mixed oxides of Y, Ba and Cu with a molar ratio of about (1:2:3) |
| J | 2-EH with 2% by weight of oxalic acid | aqueous metal nitrate solution of Y | Submicron sized spherical particles containing mixed oxide of Y |
| K | 2-EH with 2% by weight of oxalic acid | aqueous metal nitrate solution of Ba | Submicron sized spherical particles containing mixed oxide of Ba |
| L | 2-EH with 2% by weight of oxalic acid | aqueous metal chloride solution of Cu | Submicron sized spherical particles containing mixed oxide of Cu |

[7]ethanol
[8]cyclohexane

Figure 3:
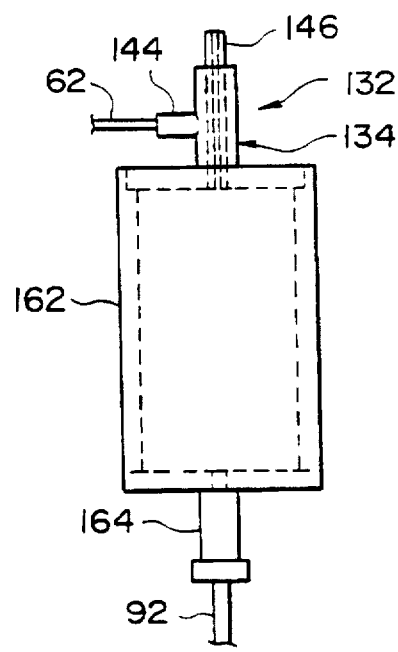
FIG. 3 is a side elevational view of a nozzle and container capable of use in the apparatus illustrated in FIG. 2.
Figure 5:
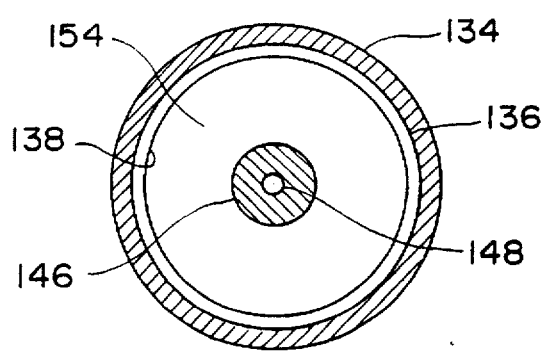
FIG. 5 is an enlarged, horizontal cross-section view of the nozzle of FIG. 3.
Figure 4:
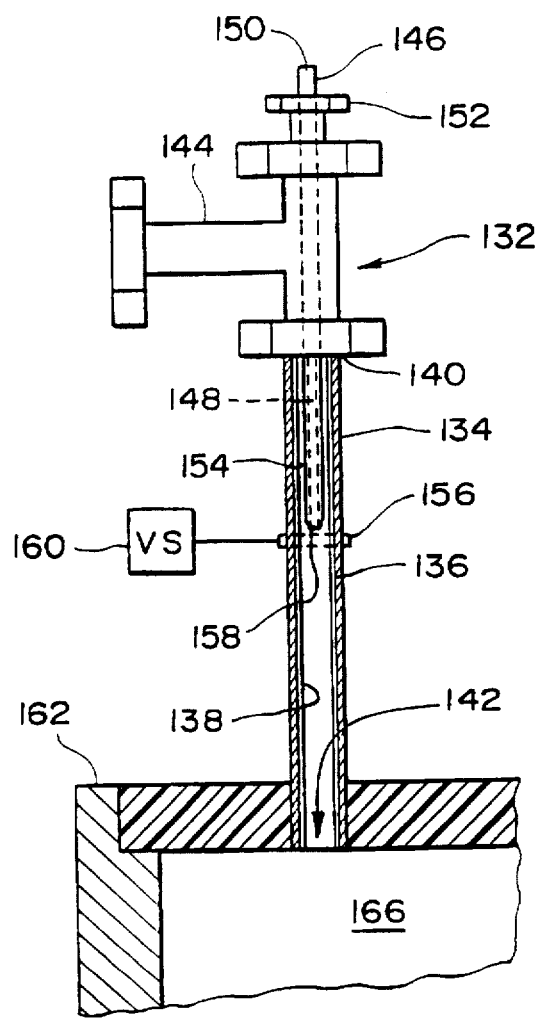
FIG. 4 is an enlarged, vertical cross-sectional view of the nozzle of FIG. 3.

Referring now to FIGS. 3, 4 and 5, an alternative nozzle 132 for an electric dispersion reactor can be used in the apparatus of FIG. 2 to supplant the reaction vessel 42. The nozzle 132 includes an nonconductive outer cylindrical body 134. The outer cylindrical body 134 is preferably made of glass, although other nonconductive materials can be used while remaining within the spirit of the present invention.

The outer cylindrical body 134 is annular and includes a nonconductive hydrophobic sheath 136 covering its inner wall 138. The hydrophobic sheath 136 is preferably polyolefin, although other materials can be used. The hydrophobic sheath 136 hinders the droplets in the aqueous phase dispersion from collecting on the inner wall 138 of the outer cylindrical body 134.

Additionally, the outer cylindrical body 134 has an open upper end 140 for receiving the continuous phase fluid and an open bottom 142 which functions as a fluid outlet for the continuous phase material. A teflon T-shaped inlet 144 is secured to the upper end 140 of the outer cylindrical body 134. The T-shaped inlet 144 can be coupled to the continuous phase fluid storage 46 of FIG. 2 through conduit 62.

An inner cylindrical body 146 has a central opening 148 and delivers a disperse phase fluid at a predetermined flow rate into the continuous phase fluid. Preferably, the inner cylindrical body 146 is made of a nonconductive material, such as glass, and includes an inlet 150 which can be connected to the storage 66 for disperse phase fluid through conduit 74, and an outlet 148.

The inner cylindrical body 146 is mounted coaxially with the outer cylindrical body 134 by a flange 152 secure at the upper end of the T-shaped inlet 144. The coaxial arrangement of the outer cylindrical body 134 and the inner cylindrical body 146 creates an annular space 154 through which the continuous phase fluid passes.

An electrode 156 is positioned outside of the outer cylindrical body 134 at a position just below the outlet 158 of the inner cylindrical body 146. The location of the electrode 156 outside the outer cylindrical body 134 prevents short circuits from occurring between the inner and outer cylindrical bodies 146, 134. The electrode 156 is a metal ring, and is 0.1 in. wide by 0.075 in. height in its preferred embodiment. With the disperse phase fluid being grounded, a transient electric field comprised of alternating positive and negative pulses is used to induce charge on the inside of the nonconducting hydrophobic sheath 136, which in turn forms the electric field causing the droplet break-up at the outlet 158 of the glass inner cylindrical member 146. A voltage source (VS) 160 shown in FIG. 4 generates the electric field at a location within the outer cylindrical body 134 where the disperse phase enters the continuous phase. The voltage source 128 illustrated in FIG. 2 can be modified to accommodate the nozzle of FIGS. 3, 4 and 5. The preferred source is a pulsed D.C. source as described previously with respect to FIG. 2.

A non-electrically conductive mounting plate 162 is used to mount the nozzle 132 to the container 162, although any suitable mounting means can be employed instead. Moreover, the nozzle 132 can be mounted in other processing systems which require the electric dispersion of one fluid into another.

The lower end of the container 162 is provided with an outlet 164 which can be coupled to the conduit 92 of the apparatus described in FIG. 2 so that the continuous phase fluid, containing dispersed particles, can be communicated to a separation stage.

The nozzle of FIGS. 3, 4 and 5 was tested using 2-ethyl 1-hexanol as the continuous phase and an aqueous phase comprised of very dilute to saturated solutions of yttrium nitrate, zirconyl nitrate, aluminum nitrate, aluminum sulfate, barium chloride, cupric chloride and various other salts. The continuous phase was supplied at a rate between about 0 and 400 cc/min., while the disperse phase flowed at approximately 10% of the continuous phase flow rate (i.e., approximately between about 0 and 40 cc/min.). The electrical parameters were peak voltages of 40 Kv and pulse frequencies of up to 5 kHz. The present embodiment produced good, consistent dispersions with no arcing at dispersed phase concentrations up to 4%.

In most cases, the continuous phase material flows continuously through the inner cylindrical body at a predetermined flow rate towards the collection area 166 defined by container 164, and the disperse phase fluid flows through the annular space 154 in the outer cylindrical body 134. The continuous phase material is dielectric and the disperse phase fluid is electrolytic or electrically conductive, or otherwise have a significant difference in electrical conductivity. The flow of continuous phase fluid past the outlet 158 of the inner cylindrical body 146 ensures the removal of the dispersion from the electrode region, and allows a more efficient removal and separation.

According to the present invention, the organic or continuous phase fluid has a flow velocity that is similar to the aqueous or disperse phase fluid velocity, or greater. The voltage source 150 generates a pulsed D.C. electric field that generates electric field induced stresses so great that the dispersion is propelled away from the outlet 158 of the inner cylindrical body 146.

The diameters of the reaction nozzle parts are proportionally related, in the illustrated embodiment. In one embodiment of the present invention, the outer cylindrical body 134 has an outer diameter of 0.375 in. and an inner diameter of 0.280 in.; the hydrophobic sheath 136 has a thickness of 0.030 in.; and the inner cylindrical body 146 has an outer diameter of 0.125 in. and an inner diameter of 0.015 in.

As discussed above, flow rates for an aqueous disperse phase fluid and an organic continuous phase fluid range from 0 to 40 cc/min and 0 to 400 cc/min, respectively. At these flow rates, drops are dispersed into very small droplets with relatively low voltage settings. At low flow rates for the disperse phase fluid the dispersion is readily swept away from the electrode region with very little to no organic continuous phase fluid flow. With increasing flow rates of disperse phase fluid, the flow rate of the continuous phase fluid must also be increased to ensure removal of the dispersion from the electrode region. The above flow rates were accomplished using a nozzle having the dimension discussed above.

It will be noted from the above that the present application provides for a method and apparatus for the production of metal oxide or other powders with particle sizes in the sub-micron range. It will also be noted that these particles are monodispersed and quite suitable for use as ceramic precursors, among other things. In addition, it may be seen that metal oxide powders which have porous and flaky particles may be produced as well as metal oxide powders which have spherical and dense particles.

Various of the features of the invention which are believed to be new are set forth in the appended claims.

What is claimed is:

1. A method of forming ceramic precursor particles comprising the steps of:

delivering a continuous phase fluid to a collection area with first nonconductive means;

delivering a disperse phase fluid into the continuous phase fluid with second nonconductive means, in fluid communication with the first nonconductive means; and generating an electric field at a location within the first nonconductive means where the disperse phase enters the continuous phase with voltage means, the electric field having an intensity sufficient to disperse the disperse phase fluid into the continuous phase fluid.

2. A method according to claim 1, wherein the first nonconductive means includes a hollow outer cylindrical body having a fluid inlet and an open end serving as a fluid outlet.

3. A method according to claim 2, wherein the hollow outer cylindrical body includes a hydrophobic sheath covering an inner wall of the outer cylindrical body 4. A method according to claim 3, wherein the hydrophobic sheath is nonconductive.

5. A method according to claim 4, wherein the hydrophobic sheath is made from polyolefin.

6. A method according to claim 2, wherein the second nonconductive means includes a hollow inner cylindrical body having a fluid inlet and an open end serving as a fluid outlet, the hollow inner and outer cylindrical bodies being substantially coaxial.

7. A method according to claim 1, wherein the electrical field is generated by an electrode positioned externally of the first means.

* * * * *